(12) United States Patent
Priestas et al.

(10) Patent No.: US 11,562,143 B2
(45) Date of Patent: Jan. 24, 2023

(54) ARTIFICIAL INTELLIGENCE (AI) BASED DOCUMENT PROCESSOR

(71) Applicant: ACCENTURE GLOBAL SOLUTIONS LIMITED, Dublin (IE)

(72) Inventors: James Robert Priestas, Alexandria, VA (US); Tara Lynn O'Gara, Chicago, IL (US); Sarat Gurram, Mumbai (IN); Travis Bowers, Cambridge, MA (US); Theresa M. Gaffney, Milton, MA (US); Piper Frances Tucker, Chicago, IL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 338 days.

(21) Appl. No.: 16/944,879

(22) Filed: Jul. 31, 2020

(65) Prior Publication Data
US 2020/0364404 A1 Nov. 19, 2020

Related U.S. Application Data

(63) Continuation-in-part of application No. 16/531,848, filed on Aug. 5, 2019, now Pat. No. 11,003,796, (Continued)

(30) Foreign Application Priority Data

May 12, 2020 (IN) .............................. 202014020088

(51) Int. Cl.
*G06F 40/10* (2020.01)
*G06F 40/284* (2020.01)
(Continued)

(52) U.S. Cl.
CPC ............ *G06F 40/284* (2020.01); *G06F 16/93* (2019.01); *G06F 40/205* (2020.01);
(Continued)

(58) Field of Classification Search
CPC ........... G06F 40/10; G06F 40/40; G06F 16/93
See application file for complete search history.

(56) References Cited

U.S. PATENT DOCUMENTS 6,014,680 A   1/2000  Sato
6,778,979 B2  8/2004  Grefenstette et al.
(Continued)

FOREIGN PATENT DOCUMENTS

CA  2831300   3/2012
EP  2343670   7/2011
(Continued)

*Primary Examiner* — Daniel Abebe
(74) *Attorney, Agent, or Firm* — Mannava & Kang, P.C.

(57) ABSTRACT

An Artificial Intelligence (AI) based document processing system receives a request including one or more of a message and documents related to a process to be automatically executed. A process identifier is extracted and used for retrieving guidelines for the automatic execution of the document processing task. Machine Learning (ML) models, each corresponding to a guideline, are used to extract data responsive to the guidelines. Based on the responsive data meeting the approval threshold and the automatic document processing task executed, one or more of a recommendation to accept or reject the request, and a corresponding letter can be automatically generated.

20 Claims, 11 Drawing Sheets

Related U.S. Application Data which is a continuation-in-part of application No. 16/179,448, filed on Nov. 2, 2018, now Pat. No. 10,796,080, which is a continuation-in-part of application No. 15/922,567, filed on Mar. 15, 2018, now Pat. No. 10,489,502, which is a continuation-in-part of application No. 15/879,031, filed on Jan. 24, 2018, now abandoned.

(60) Provisional application No. 62/674,367, filed on May 21, 2018, provisional application No. 62/527,441, filed on Jun. 30, 2017.

(51) Int. Cl.
| | |
|---|---|
| *G06F 40/205* | (2020.01) |
| *G06F 16/93* | (2019.01) |
| *G06Q 10/10* | (2012.01) |
| *G06K 9/62* | (2022.01) |
| *G06Q 40/08* | (2012.01) |
| *G06N 3/08* | (2006.01) |
| *G06V 30/40* | (2022.01) |

(52) U.S. Cl.
CPC ............ *G06K 9/6256* (2013.01); *G06N 3/08* (2013.01); *G06Q 10/10* (2013.01); *G06Q 40/08* (2013.01); *G06V 30/40* (2022.01)

(56) References Cited

U.S. PATENT DOCUMENTS

| | | | |
|---|---|---|---|
| 7,117,432 B1 | 10/2006 | Shanahan et al. | |
| 8,429,179 B1 | 4/2013 | Mirhaji | |
| 9,734,289 B2 | 8/2017 | Pecora | |
| 10,291,796 B2* | 5/2019 | Irons | H04N 1/00334 |
| 2002/0103834 A1 | 8/2002 | Thompson | |
| 2003/0061201 A1 | 3/2003 | Grefenstette et al. | |
| 2005/0108001 A1 | 5/2005 | Aarskog | |
| 2005/0257140 A1* | 11/2005 | Marukawa | G06F 16/355 715/255 |
| 2006/0020466 A1 | 1/2006 | Codsinead et al. | |
| 2006/0104511 A1 | 5/2006 | Guo et al. | |
| 2006/0184522 A1* | 8/2006 | McFarland | G06F 21/6209 707/999.005 |
| 2007/0279672 A1 | 12/2007 | Harada | |
| 2009/0012842 A1 | 1/2009 | Srinivasan et al. | |
| 2009/0070295 A1 | 3/2009 | Otomori | |
| 2009/0106775 A1* | 4/2009 | Cermak | G06F 40/143 719/318 |
| 2010/0174732 A1 | 7/2010 | Levy et al. | |
| 2010/0293451 A1 | 11/2010 | Cards | |
| 2014/0149322 A1 | 5/2014 | Lavoie | |
| 2015/0286842 A1 | 10/2015 | Mori | |
| 2015/0317613 A1 | 11/2015 | Clark | |
| 2016/0203336 A1 | 7/2016 | Nambiar | |
| 2017/0236154 A1 | 8/2017 | Purves | |
| 2018/0046764 A1 | 2/2018 | Katwala et al. | |
| 2019/0019022 A1 | 1/2019 | Marda | |
| 2019/0005012 A1 | 3/2019 | Priestas | |
| 2019/0156060 A1 | 5/2019 | Maier | |
| 2019/0213354 A1 | 7/2019 | Bhowan | |
| 2019/0236102 A1 | 8/2019 | Wade | |
| 2019/0251514 A1 | 8/2019 | Verones et al. | |
| 2019/0272384 A1 | 9/2019 | Kawabata | |

FOREIGN PATENT DOCUMENTS

| | | |
|---|---|---|
| EP | 3422202 | 1/2019 |
| JP | 2005-050245 | 2/2005 |
| JP | 2006-079189 | 3/2006 |
| JP | 2009-223662 | 10/2009 |
| JP | 2010-140457 | 6/2010 |
| JP | 2015-143906 | 8/2015 |
| WO | 02/056196 | 7/2002 |
| WO | 2009/006609 | 1/2009 |
| WO | 2017/139499 | 8/2017 |

* cited by examiner

FILE ID: 1111_DEMO

CHARTS/DAY (GOAL - 3) | AVG TIME/CHART | TIMER | HIDE

LETTER TO HEALTH PLAN

*PLEASE REVIEW THE FOLLOWING LETTER AND IT WILL BE SENT TO HEALTH PLAN*

PATIENT NAME: JOHN SMITH
HOSPITAL: JERRY WEST HOSPITAL
DATE OF BIRTH: 6/11/1953
MEMBER ID: 13243546
PIEDMONT ACCOUNT NUMBER: 58526563
CLAIM NUMBER: 47855
TAX ID: 1235633
NPI: 2375900164
DATES OF SERVICE: 5/3/2017 - 5/9/2017
BILLED AMOUNT: NA

DEAR APPEALS COORDINATOR REVIEWER,

PLEASE ALLOW THIS LETTER TO SERVE AS THE 1ST LEVEL APPEAL REQUEST IN RESPONSE TO THE ABOVE REFERENCED CLAIM. MEDICAL NECESSITY SERVICES WERE RENDERED TO YOUR MEMBER ON 5/3/2017 - 5/9/2017. WE ARE CONFIDENT THAT YOU WILL REMIT THE DENIED PORTION OF THE CLAIM AFTER THE REVIEW OF THE FOLLOWING INFORMATION.

JOHN SMITH WAS A 66-YEAR-OLD MALE WHO WAS DENIED AND AFTER FURTHER REVIEW, EVIDENCE HAS FOUND UNDER POLICY 1234, THAT CATEGORIZES JOHN SMITH AS 50 - NON - CVD, NOT DEEMED MED NECCESSITY FOR THE INPATIENT OBSERVATION SERVICES PROVIDED ON CLAIM 47855.

SUBMIT 6/11/1953

ARTIFICIAL INTELLIGENCE (AI) BASED DOCUMENT PROCESSOR

PRIORITY

This application claims priority to the Indian Patent Application no. 202014020088 filed on May 12, 2020 and is a continuation-in-part of the U.S. Non-provisional application Ser. No. 16/531,848, filed on Aug. 5, 2019, which in turn claims priority to the U.S. Non-provisional application Ser. No. 16/179,448 filed on Nov. 2, 2018, which in turn claims priority to U.S. Provisional patent application No. 62/674,367, filed on May 21, 2018. This application is also a continuation-in-part of U.S. Non-provisional application Ser. No. 15/922,567, which was filed on Mar. 15, 2018, now U.S. Pat. No. 10,489,502, which is a continuation-in-part of U.S. Non-provisional application Ser. No. 15/879,031 filed on Jan. 24, 2018, which in turn claims priority to U.S. provisional application Ser. No. 62/527,441, filed on Jun. 30, 2017, the disclosures of these applications are expressly incorporated herein by reference in their entireties.

BACKGROUND

The evolution of Artificial Intelligence (AI) and machine learning (ML) technologies is enabling machines to take over many manual processes. Many organizations are taking significant strides in this direction by adopting cognitive and ML technologies for automating different processes. Machines, such as computers, possess different skills than human employees in that the machines are good in terms of precision and consistency. However, machines tend to underperform employees at tasks that require contextual understanding and complex communication. Therefore, moving a battery of repetitive tasks to be handled by machines provides an advantage in improving the efficiency of repetitive tasks; however, these machines often perform poorly when applied to complex task and/or tasks requiring contextual understanding.

Numerous processes within organizations are driven by documents which not only serve as the inputs for these processes but are used to collate the outputs of the processes. The automation of various tasks can therefore be based primarily on the processing of the documents involved in the tasks. Many legacy systems that were based on paper documents are being digitized and moved online to enable the process automation. Forms or documents of various types are widely used for these purposes. The documents can include processor-readable documents including those with structured and unstructured data as well as scanned images, photographs, etc., which need to be further processed by the machines prior to collecting and analyzing their data to drive the process automation.

BRIEF DESCRIPTION OF DRAWINGS

Features of the present disclosure are illustrated by way of examples shown in the following figures. In the following figures, like numerals indicate like elements, in which:

FIG. 9 shows an example graphical user interface (GUI) associated with a provider denial that is generated by the document processing system in accordance with the examples disclosed herein.

FIG. 10 shows a provider denial appeal letter that is automatically generated in accordance with the examples disclosed herein.

DETAILED DESCRIPTION

Figure 1:
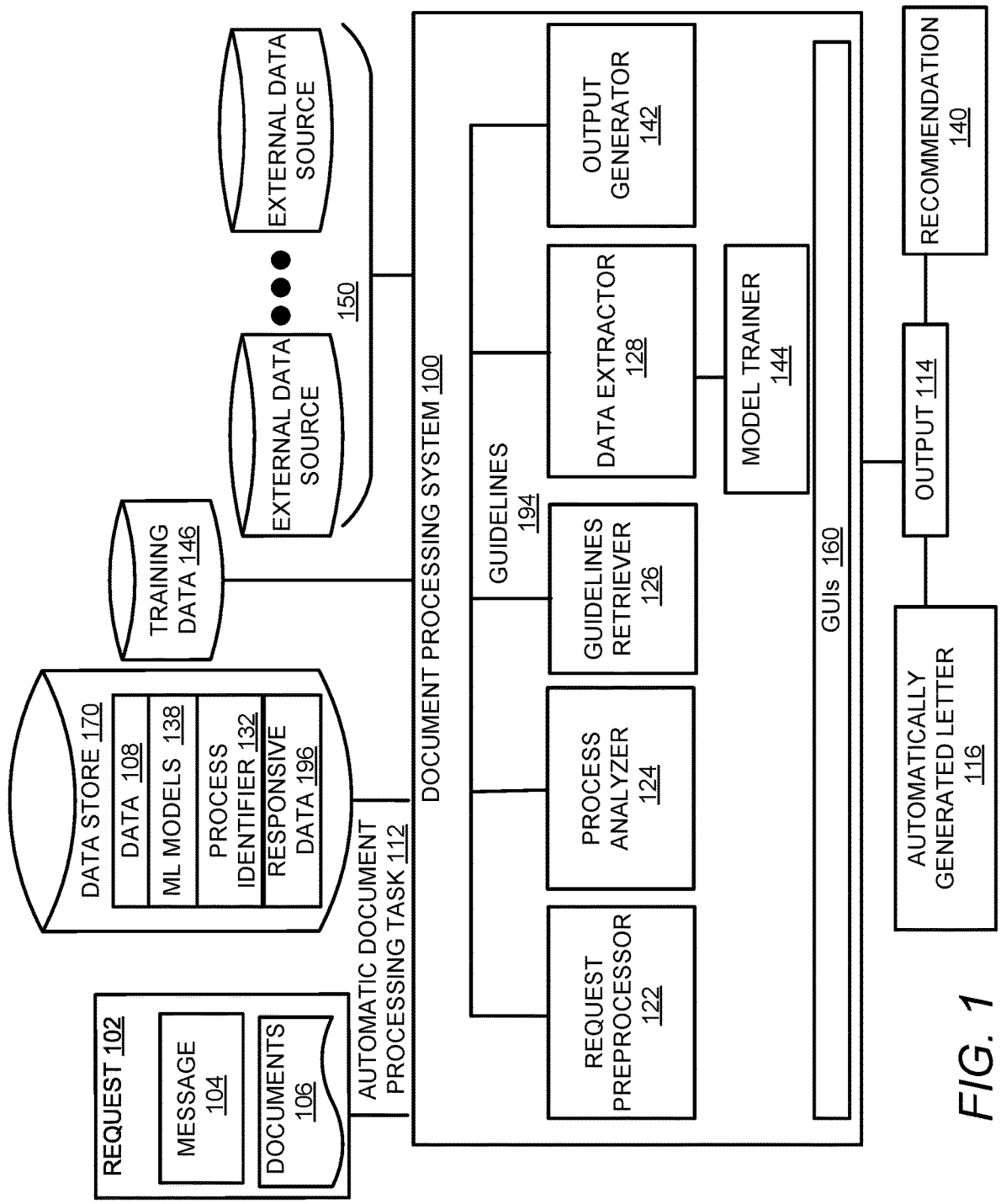
FIG. 1 shows a block diagram of an AI-based document processing system in accordance with an example.

For simplicity and illustrative purposes, the present disclosure is described by referring mainly to examples thereof. In the following description, numerous specific details are set forth to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, an artificial intelligence (AI) based document processing system is described for the execution of an automatic document processing task based at least on the information conveyed in a request for the execution of the automatic document processing task. The request can include textual, voice or other data communication providing some identifying indicia pertaining to and seeking an output or a result of the execution of the automatic document processing task. If the request is received as voice data, then speech to text application programming interfaces (APIs) can be used to obtain the request in a textual format. The request may additionally include one or more supportive documents. The request is preprocessed by parsing, tokenizing and generating parts of speech (POS) data for the tokens. The tokens and the POS data are used to identify a specific automatic document processing task to be executed from a plurality of automatic document processing tasks that the document processing system may be configured for. In one example, the automatic document processing task can be identified based on a process identifier that can be determined from the tokens generated from the request. In one example, the data generated by preprocessing the request can be used to identify one or more external data sources which can provide the process identifier.

Upon identifying the specific automatic document processing task to be executed, guidelines for the execution are retrieved from one or more external data sources. The guidelines can include requirements such as data requirements for the execution of the automatic document processing task. A plurality of machine learning (ML) models are used to extract data responsive to the requirements. Each of the ML models corresponds to a respective guideline and is trained to extract data that fulfill requirements the guideline. Different ML models based on different algorithms can be trained to extract the responsive data. The ML model that corresponds to a guideline will depend on the type of data that is responsive to that guideline. In an example, a plurality of ML models can be trained on labeled training data generated by subject matter experts for each of the plurality of ML models. In an example, the labeled training data from different documents in historical records includes data that is identified as responsive to each of the requirements of a given guideline.

Responsive data extracted by the plurality of ML models is then analyzed for determining if it meets a threshold condition that in turn determines an output of the automatic document processing task. In an example, the threshold condition can pertain to a minimum number of guidelines or requirements to be met by the responsive data. However, the guidelines/requirements may be weighted. In such instances, an approval score can be calculated for the responsive data, for example, by aggregating weighted scores of each requirement met by the responsive data. If a minimum approval score is achieved by the responsive data, the automatic document processing task is executed to generate a first type of output. If the responsive data fails to meet the requirements and the request does not achieve the minimum approval score, then the automatic document processing task is executed to generate a second type of output. The outputs thus generated can include a recommendation to approve or reject the request in one example. In one example, an output including an automatically generated letter including the approval or rejection decision may also be produced by the document processing system.

The AI-based automatic document processing system disclosed herein provides for a technical improvement by enabling more accurate data extraction, as compared to conventional techniques, thereby providing better process automation. Many process automation systems receive certain data inputs, analyze the received data and produce certain outputs or automatically execute certain tasks based on the analyses of the received inputs. The automatically executed tasks can include, but are not limited to, generating recommendations or automatically sending out certain notifications or communications to preconfigured parties, etc. In the AI-based document processing system disclosed herein, the automatically executed tasks also include automatically generating letters, such as, appeal letters for provider denials. As the output that is generated depends on the data inputs provided, greater accuracy of the data inputs ensures more accurate outputs. However, the information can be input to these automation systems in various forms including images, documents, databases, voice files, video files, etc. Extracting data accurately from data sources having a plurality of formats to meet the requirements in the guidelines for complex processes such as claims processing, inventory management, etc., can be a challenge. By employing the plurality of ML models disclosed herein ensures that accurate data is extracted for that guideline. For example, each ML model may be selected and trained to meet one or more requirements of each of the guidelines. In fact, an ML model can be selected for training based on a type of data to be extracted to meet the guideline requirements. The document processing system therefore ensures accurate extraction of input data. As a result, the outputs such as recommendations, communications, auto-generated letters, etc., are based on accurate input information. In some instances, such outputs can also be used to drive downstream processes/systems such as Robotic Process Automation (RPA) systems, Enterprise Resource Planning (ERP) systems, etc. The AI-based document processing system therefore ensures accurate data extraction which results in efficient process automation throughout the various levels of an organization.

FIG. 1 shows a block diagram of an AI-based document processing system 100 in accordance with an example. The system 100 receives a request 102 pertaining to one of a plurality of automated document processing tasks that the system 100 can be configured to execute. The plurality of document processing tasks can include processing a claim associated with a disability insurance and/or casualty insurance policy in some examples. In another example, document processing tasks such as processing provider denials of insurance claims may also be automatically executed by the system 100 as one of the plurality of automated document processing tasks. The request 102 can be received by the system 100 via different modalities, including but not limited to, email, messaging service, a GUI, a data store, a portal associated with the document processing system 100, a social network platform, etc. The request 102 can include a message 104 with certain content and may optionally include one or more documents 106 associated with the information conveyed in the message 104. If the request 102 is received in a written format then the textual content of the message 104 can be extracted directly. However, if the request 102 is received in a voice/video format, then the textual content from the message 104 can be extracted using voice-to-text application programming interfaces (APIs). The message 104 and the documents 106 can include certain textual content of a plurality of information types/structures. The textual content in one or more of the message 104 and the documents 106 can be presented as structured data with well-formatted information structures such as tables, lists, numbered lists, indented textual content, or unstructured data such as comma separated values (CSV) data, spreadsheets, etc. For example, if the request 102 pertains to a worker's compensation claim, the message 104 may include details regarding the party making the claim, claim identification details such as claim number, policy number, dates, etc. The documentation 106 associated with the claim can include the claimant's work identification, the claimant's medical records, letters from the medical providers such as the doctors, etc. Similarly, if the request 102 pertains to a casualty insurance claim associated with a theft for example, the message 104 may include text describing the claim including claim details such as the claim number, policy number, claimant name, place associated with the theft, the claimants address, etc. The documents 106 can include a police report, a formal valuation of the goods stolen, copies of the policy documents, etc.

The document processing system 100 processes the message 104 and/or the documents 106 to extract data 108 required for the execution of the automated document processing task specified by the request 102. If the automated document processing task pertains to processing of a workers' compensation or casualty insurance claim, the document processing system 100 can analyze the information from the request 102 and one or more external data sources 150 to generate a recommendation 140 on whether or not the claim can be approved. The external data sources 150 can include information regarding the various policies in implementation, the policy holders, the requirements associated with the policies, and the historical transaction data of the various policy holders, etc. The external data sources 150 can include data sources with structured or unstructured data and which include information pertaining to specific policies. For example, if the automatic document processing task pertains to resolving a workers' compensation claim, then the external data source that is accessed by the data processing system 100 can pertain to databases including information regarding workers' compensation policies and subscribers of such policies. Similarly, if the automatic data processing task pertains to a casualty insurance policy then the external data source selected by the data processing system 100 can include information relating to casualty insurance policies, the guidelines associated with the policies, the subscribers of such policies, etc. Therefore, one or more of the external data sources 150 can be selected for information extraction based on the policy details obtained from the request 102.

Various components of the data processing system 100 can access or generate one or more graphical user interfaces (GUIs) 160 which can be used for various user interactions. For example, one of the GUIs 160 can be used to transmit the request 102 while another one of the GUIs displays the data 108 extracted from the request 102. An output 114 that is generated may depend on the automated data processing task executed by the document processing system 100. If the automated document processing task 112 relates to an insurance claim, then the output 114 can include the recommendation 140. If the automated document processing task relates to a provider denial of a claim, the output 114 may additionally include an automatically generated letter 116 which appeals the denial to the provider along with the requisite documentation. In an example, the documentation accompanying the letter 116 may include documents extracted from the request 102 or documents obtained from the external data sources 150. Output 114 can include other types of data and/or information based on a given configuration of system 100.

The document processing system 100 includes a request preprocessor 122, a process analyzer 124, and an output generator 142. The request preprocessor 122 processes the request 102 to obtain the data 108 included in the request 102. In an example, the request preprocessor 122 can employ techniques such as, but not limited to, parsing, tokenizing and parts of speech (POS) tagging on the text included within the message 104 and/or the documents 106. In an example, the document processing system 100 can be coupled to a data store 170 for the storage of information that is generated and used by the document processing system 100 during the execution of the various automatic document processing tasks. Accordingly, the data 108 obtained by the request preprocessor 122 can be stored within the data store 170.

The process analyzer 124 accesses the data 108 obtained by the request preprocessor 122 to identify an automatic document processing task to be executed. As mentioned above, the data 108 can include a process identifier 132 relating to the processes to be executed. Depending on the automatic document processing task to be executed one or more of the process identifier 132, e.g., certain keywords, member identifiers, etc. While the description herein generally refers to the process identifier 132 as enabling identification of the automatic document processing task, other process identifiers may also be used in accordance with some examples disclosed herein. In an example, a policy can pertain to an insurance policy associated with a workers' compensation claim. Upon the process identifier 132 identifying the policy pertaining to the request 102, the guidelines retriever 126 retrieves guidelines 194 associated with the policy. In an example, the guidelines 194 can be retrieved from one of the external data sources 150 that pertains to the policy. Therefore, different policies may necessitate retrieval of the guidelines 194 from different external data sources. In an example, the guidelines 194 retrieved from one of the external data sources 150 may be cached temporarily on the data store 170 during the execution of the automatic document processing task 112. The guidelines 194 can include certain data requirements that need to be met if the automatic document processing task is to be executed. Referring again to the worker's compensation request example, the corresponding guidelines can include data requirements for the claimant's information such as name, social security number, address, employer information, type of job, date of injury, nature of injury, etc. In addition, the guidelines 194 can also include requirements for clinical data and medical history of the claimant. The responsive data 196 per the requirements of the guidelines 194 is extracted from one or more of the data 108 and the external data sources 150 by the data extractor 128 using a plurality of ML models 138. In an example, each of the requirements and/or the guidelines 194 can be associated with a corresponding ML model that is trained to identify information responsive to the requirement. For example, if a guideline includes multiple requirements, then respective multiple ML models are used for extracting the data responsive to that guideline. If the guideline includes only one requirement, then a single ML model may be used for the extraction of responsive data for that guideline. The responsive information can include multiple pieces of data that is gathered by the corresponding ML model from the different data sources. The responsive information can be presented via one of the GUIs 160 for validation.

In an example, the output generator 142 can be configured to present the results from the data extractor 128 for validation. The output generator 142 can be further configured to generate a recommendation to approve or reject the request 102 based on the responsive data 196 and letters may be automatically generated to convey the output 114. If the request 102 pertains to a workers' compensation claim or a casualty insurance claim, the output generator 142 can be configured to determine whether the request 102 satisfies certain threshold criteria. Based on the request 102 satisfying the threshold criteria, the recommendation 140 to approve or reject the request can be generated. Certain automatic actions can be executed by the document processing system 100 upon validation of the responsive data 196. The automatic actions can be executed based on the type of document processing task specified in the request 102. In an example, a recommendation to approve the request 102 can cause the document processing system 100 to produce an automatically generated letter 116 to include an approval of the request, while a recommendation to reject the request 102 can cause the document processing system 100 to produce the automatically generated letter 116 with a rejection of the request 102. Moreover, when the automatic document processing task 112 pertains to processing a provider denial, another one of the automatic actions that the output generator 142 can be configured to execute includes producing an automatically generated letter 116 for appealing the provider denial.

The document processing system 100 further includes a model trainer 144 for training the plurality of ML models 138. The model trainer 144 can employ training data 146 to train the plurality of ML models 138 to extract the responsive data 196 for the guidelines 194. The plurality of ML models 138 are trained via supervised training methods in one example. The training data 146 for the supervised training can be generated for each requirement within the guidelines 194 by identifying from different data sources various pieces of information that are responsive to that requirement. In fact, it can happen that the same information can be conveyed in different formats. For example, proof of an injury can be provided as text describing the injury or as an image of the injury. Accordingly, multiple ML models of the plurality of ML models 138 can be trained to identify responsive data for the same requirement. The contributions of the multiple ML models for that requirement can be considered in terms of weightage that the request 102 is assigned under that requirement when processing for approval/rejection thresholds.

The ML model to identify textual information can be trained on identifying different words for the same condition, using contextual data to identity the condition, etc. In an example, the ML model to identify images pertaining to the condition can be trained on different images of that condition taken from different people and different angles accompanied with an instruction that the images pertain to the specific condition. Similarly, an ML model can be trained on multiple data instances of a particular data type that can occur within the training data 146. As newer guidelines and data requirements are added/updated, or newer insurance products are introduced, new ML models can be trained or existing ML models can be upgraded in accordance with the methods outlined herein to extract the data responsive to the newer guidelines.

Figure 2:
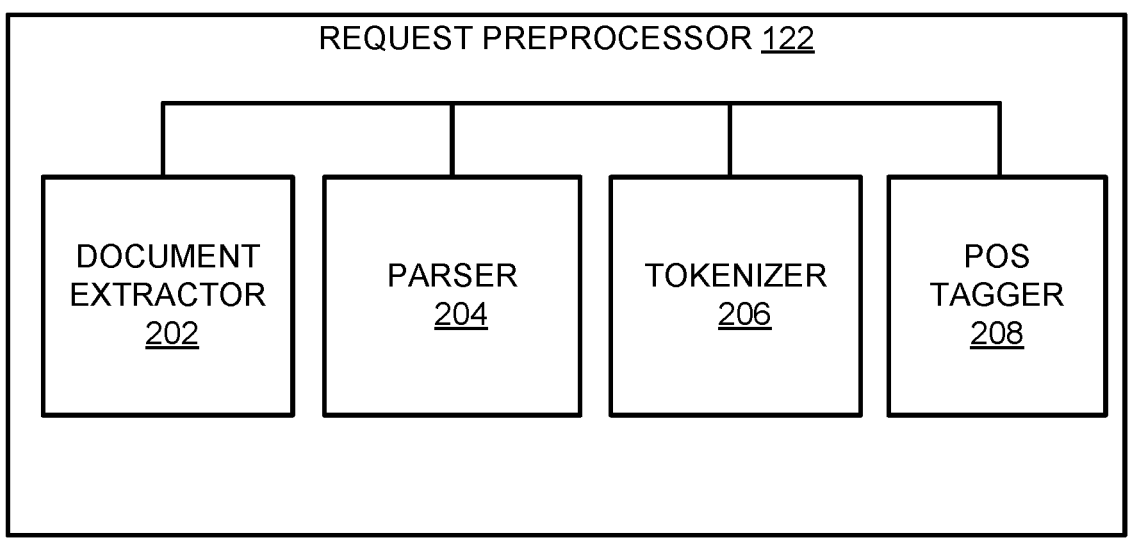
FIG. 2 shows a detailed block diagram of a request preprocessor in accordance with the examples disclosed herein.

FIG. 2 shows a detailed block diagram of the request preprocessor 122. The request preprocessor 122 can include a document extractor 202, a parser 204, a tokenizer 206, and a POS tagger 208. The document extractor 202 extracts documents associated with the request 102. Different documents can be associated with the request 102 based on the automatic document processing task 112. The documents 106 can be transmitted as attachments when the request 102 is received in an email or as accompanying messages, e.g., when the request 102 is received via a chat window or a GUI or a portal for uploading the documents 106. The parser 204 parses the text included in one or more of the message 104 and the documents 106 of the request 102. The tokenizer 206 can produce word tokens from the output of the parser 204. Tokens can be further processed to remove stop words, punctuations, etc. The POS tagger 208 tags each of the tokens with the POS information. Different policies pertaining to different automatic document processing tasks, e.g., workers' compensation, may have identifiers of string types that are different from the identifiers of casualty insurance. Therefore, a policy identifier (which serves as the process identifier 132) having a specific string type can be identified via pattern matching techniques based on the tokens, and an automatic document processing task to be executed can be identified from the specific policy identifier. The tokens from the request preprocessor 122 along with the POS information enable obtaining the process identifier 132 and other information such as process keywords that allow the process analyzer 124 to identify the automatic document processing task 112 to be executed. The guidelines retriever 126 can select one of the external data sources 150 that correspond to the automatic document processing tasks 112 to obtain details pertaining to the process identifier 132 such as the associated guidelines.

Figure 3:
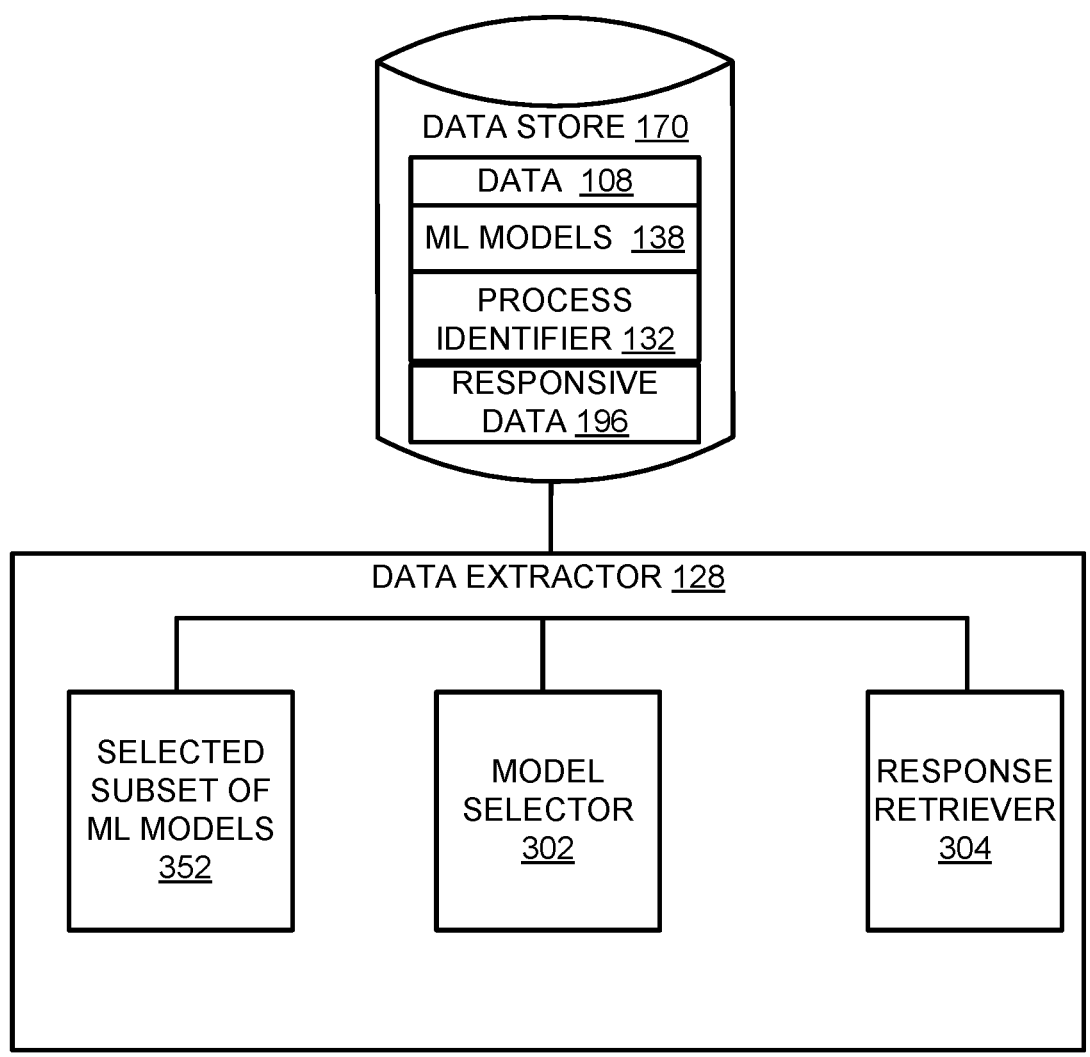
FIG. 3 shows a detailed block diagram of a data extractor in accordance with the examples disclosed herein.

FIG. 3 shows a detailed block diagram of the data extractor 128. The data extractor 128 includes a model selector 302 and a response retriever 304. The guidelines 194 that are retrieved include various requirements that are to be met in order to process the request 102. The requirements can include data requirements for identifying information of the claimant, medical details if the automatic document processing task 112 pertains to a workers' compensation claim or health related claim, the provider data, the dates associated with the claim, the employer information, etc. If the process identifier 132 pertains to a casualty insurance claim, e.g., property theft, then the guidelines 194 can have discrete data requirements for details of the claimant such as name, address, social security number, information about stolen item(s), date the theft occurred, location at which the theft occurred, date of purchase of the stolen items, a complaint number of a police report pertaining to the stolen items, images of the stolen items, color or other identifying indicia or attributes of the stolen items, etc. As mentioned above, certain data requirements can have multiple responsive data items. Each discrete piece of data responsive to the data requirement can have a corresponding ML model of the plurality of ML models 138 trained to identify that discrete piece of data. The plurality of ML models 138 can include classification models such as support vector machines (SVMs), random forests, linear classification models such as K-means, logistic regression models, etc. Based on the determined type of data responsive to a specific data requirement, ML models such as convolutional neural networks (CNNs), recurrent neural networks (RNNs), Long Short Term Memory (LSTM) or even ensemble models can be trained to identify the responsive data 196. For example, CNN based models can be trained to identify images while LSTM which is a special category of RNN can be employed to understand the context within a whole paragraph/sentence to determine whether a condition needs to be presented to a coder for associated with a specific condition code. A logistic regression model can be trained for extracting data pertaining to a categorical variable where the categorical variable constitutes at least a part of the responsive data 196 for one of the guidelines.

The model selector 302 can be configured to select a subset of one or more ML models 352 from the plurality of ML models 138 for obtaining the responsive data 196 for the requirements specified in the guidelines 194. In an example, the model selector 302 can be configured to select the correspondingly trained ML model for a given discrete piece of data. For example, if the data requirement pertains to a social security number, a specific ML model trained to identify the social security number from one or more of the request 102 or the associated external data sources 150 is selected by the model selector 302. Similarly, if an image data including an X-ray of a specific broken bone is the responsive data to be identified for a requirement, then a ML model such as a CNN trained to identify images of that specific broken bone from one or more of the request and the external data sources 150 can be selected by the model selector 302.

The response retriever 304 employs the subset of ML models 352 on one or more of the request 102 and the external data sources 150 to extract the responsive data 196. In an example, the request 102 with or without the documents 106 can include all the responsive data 196. In an example, the request 102 may be a follow up communication continuing the correspondence regarding the matter associated with the automatic document processing task 112. For example, the request 102 can be a reminder regarding a workers' compensation claim. The request 102 may therefore include minimum process-identification information, such as, the claim number. In such instances, the claim number or other identifying indicia extracted from the request 102 can be used to obtain additional information from one or more of the external data sources 150, which may store the other required information pertaining to the request 102 to generate the responsive data 196. It may be appreciated that there may be specific data sources from the external data sources 150 corresponding to the request 102. For example, when the claim number corresponds to a workers' compensation claim, only the data sources corresponding to the workers compensation products are processed by the one or more ML models 352. Metadata associated with the request 102 such as the date/time the request 102 was received, the modality (i.e., email, fax transmission, etc.) in which the request was received, the sender of the request 102, any name(s) included in the request 102 (if different from the sender of the request), etc., can also be used to determine the responsive data 196. The responsive data thus retrieved are transmitted to the output generator 142 for presentation in accordance with the automatic document processing task 112.

Figure 4:
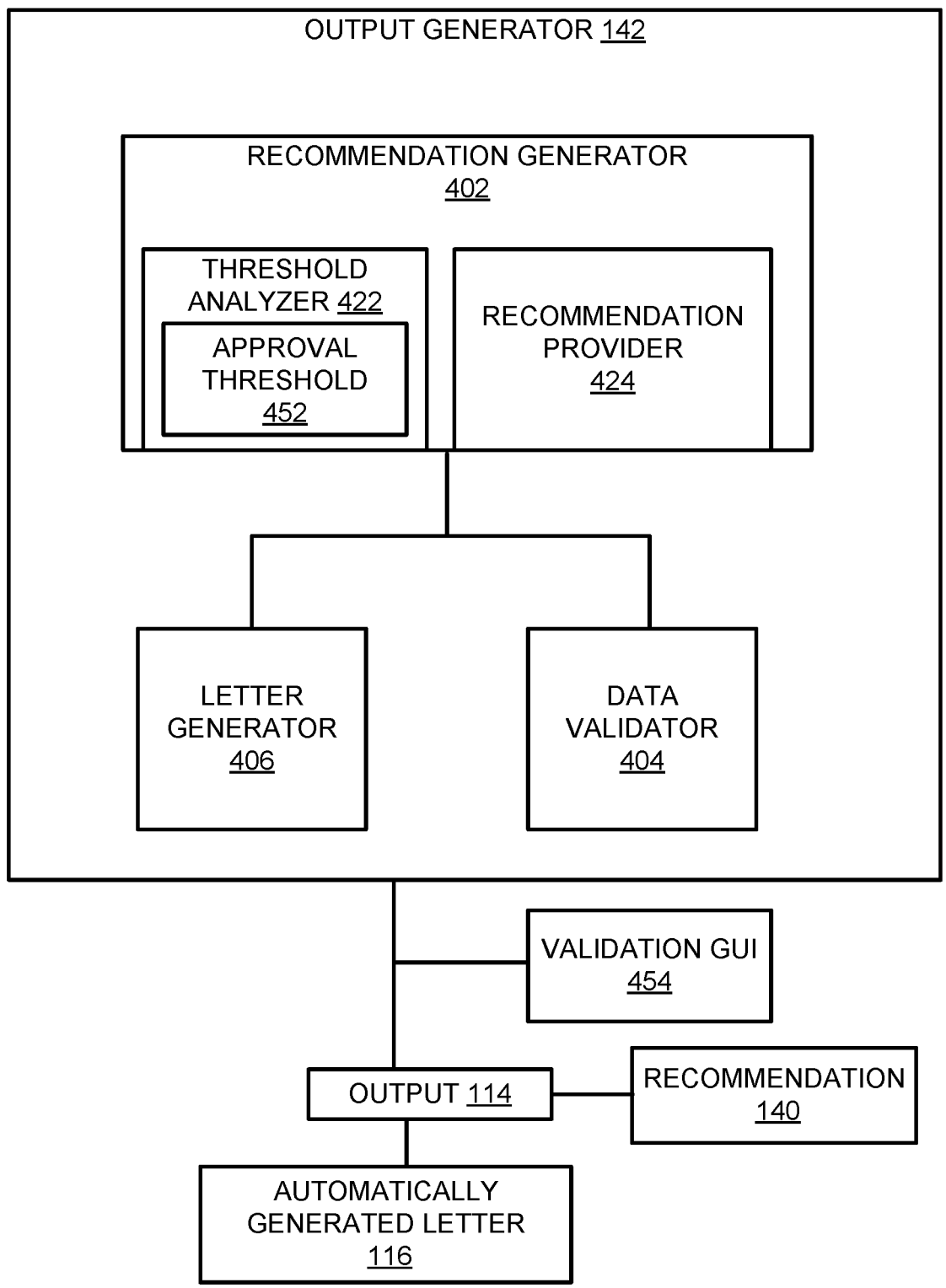
FIG. 4 shows a block diagram of an output generator in accordance with the examples disclosed herein.

FIG. 4 shows a block diagram of the output generator 142 in accordance with the examples disclosed herein. The output generator 142 includes a recommendation generator 402, a data validator 404 and a letter generator 406. The recommendation generator 402 includes a threshold analyzer 422 and a recommendation provider 424. If the automatic document processing task 112 pertains to settling an insurance claim, the recommendation generator 402 can be configured for the generation of a recommendation to approve or reject the claims based on the responsive data 196. The threshold analyzer 422 determines if an approval threshold 452 is satisfied to generate an approval recommendation. The threshold analyzer 422 can analyze different conditions based on the guidelines 194 that are satisfied. The approval threshold 452 can include calculating an approval score for the responsive data and a minimum approval score to be met for the claim to be approved. The approval score can include a weightage to be assigned to each of the requirements depending on the responsive data 196. The total weightage for the requirements in the guidelines can be designated as the approval score. The minimum approval score can be set empirically by human reviewers in an example. In another example, a minimum approval score can be programmatically set using system 100 or another device.

Reverting to the workers' compensation example, each of data such as the claimant's name, address, employer, etc., that matches the data in the records on the external data sources 150 can be assigned certain points. In addition, any medical requirements that are met can also be assigned certain points. For example, one of the guidelines 194 can be associated with an administrative requirement regarding the claimant's time period of employment while another one of the guidelines can pertain to a medical requirement for a confirmation regarding the chronic medical condition of the claimant. The administrative requirement can carry less weight as compared to the medical requirement. Even for the same requirement, e.g., the administrative requirement, positive and negative responses can carry different points. The points thus assigned to each of the guidelines 194 can be further multiplied with the corresponding weight of the guideline and aggregated across the guidelines 194 to obtain the approval score. Based on the comparison of the approval score with the minimum approval score, the threshold analyzer 422 determines if the approval threshold 452 is satisfied. If yes, the recommendation provider 424 generates a recommendation for approval of the claim, else a recommendation for rejection of the claim can be generated.

The responsive data 196 obtained by the data extractor 136 along with the recommendation 140 can be presented for validation via a validation GUI 454 generated by the data validator 404. In an example, the validation GUI 454 can present one or more of the discrete data items from the responsive data 196 in an editable format so that a human reviewer who is validating can make any necessary changes to the data. In an example, the validation GUI 454 can include two portions where the extracted data is presented in a first portion and a corresponding view of the original data source, such as, a document, a database table or an image, etc., obtained from either the request 102 or the external data source from which the data piece was extracted can be displayed in a second portion. In an example, the validation GUI 454 can also include the recommendation 140 to approve or reject a claim associated with the request 102. A human validator may agree or disagree with the recommendation 140. The feedback from the human validator including any edits to the responsive data 196 can be provided to the document processing system 100 for further training.

The output generator 142 additionally includes a document generator, such as letter generator 406, that can be activated for certain automatic document processing tasks such as provider denials. When a medical insurance claim, e.g., the workers' compensation claim is denied, the automatic document processing task 112 can pertain to analyzing the denial. If the document processing system 100 generates the recommendation 140 to withdraw the denial upon analyzing the guidelines 194 and the responsive data 196 as disclosed herein, the automatic letter generator 406 can be activated to automatically generate an appeal letter i.e., the automatically generated letter 116 appealing the denial. In an example, the automatically generated letter 116 can be generated by substituting one or more data items from the responsive data 196 into a letter template.

Figure 5:
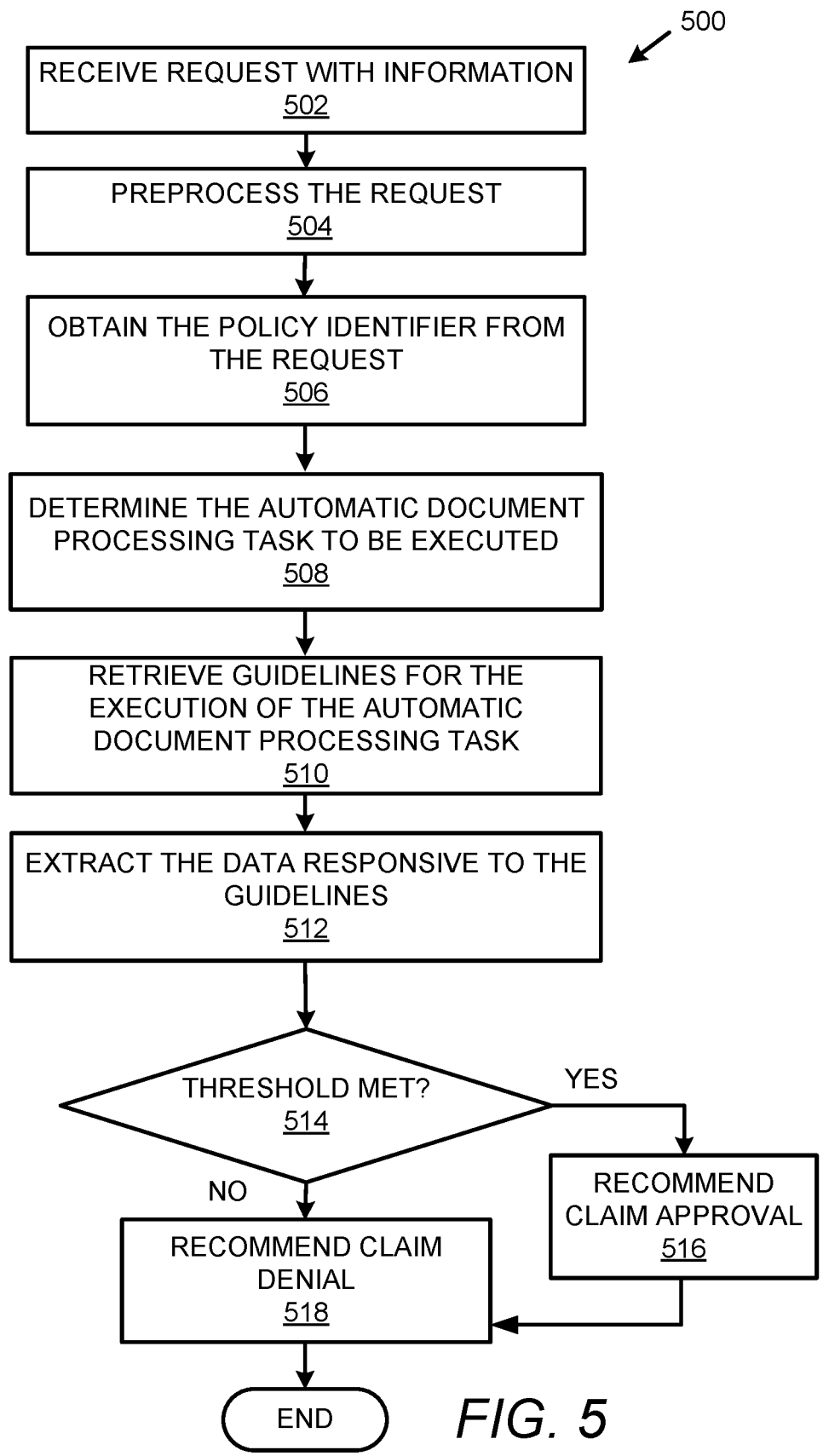
FIG. 5 shows a flowchart that details a method of executing the automatic document processing task in accordance with examples disclosed herein.

FIG. 5 shows a flowchart 500 that details a method of executing the automatic document processing task 112 in accordance with examples disclosed herein. The method begins at 502 with receiving the request 102 for the execution of the automatic document processing task 112. The request 102 includes information such as one or more of the message 104 and the documents 106. The request 102 is preprocessed at 504 to extract the documents 106 (if any) and to obtain the data 108 such as tokens or POS tags. The data 108 thus extracted is analyzed to obtain the process identifier 132 at 506. The process identifier 132 is employed to identify a process to be executed. In an example, the data 108 can include the process identifier 132 which can be employed at 508 to determine the automatic document processing task 112 to be executed.

The guidelines 194 including the requirements for the execution of the automatic document processing task 112 are retrieved at 510. In an example, the guidelines 194 can include requirements for all policies under a specific scheme. However, the guidelines 194 can also include data requirements specific to a policy represented by the process identifier 132. For example, in instances where certain data requirements essential for executing the automatic document processing task 112 were not provided in earlier communications, policy-specific data requirements to the guidelines 194 may be added programmatically or via a human reviewer. At 512, the responsive data 196 for the guidelines 194 is extracted from one or more of the request 102 and the external data sources 150 using at least a subset of the plurality of ML models 138. Each of the selected subset of ML models is trained to extract data responsive to one of the guidelines 194. At 514, the responsive data 196 is evaluated to determine if it meets, or satisfies, the approval threshold 452 for determining the output of the automatic document processing task 112. If the automatic document processing task 112 pertains to an insurance claim, the approval threshold 452 can represent a certain score attained by the claim which causes the claim to be eligible for approval. If the responsive data 196 meets the approval threshold 452, the automatic document processing task 112, such as generating a recommendation for approval of the claim associated with the request 102 is executed at 516. The automatically generated letter 116 can be produced at 520 to include the claim approval/disapproval. For example, a first automatically generated letter including the claim approval or a second automatically generated letter including the claim rejection may be produced at 520. Similarly, an appeal letter can be automatically generated upon the approval threshold 452 being met by the responsive data 196 in the instances such as provider appeals.

If it is determined at 514 that the approval threshold 452 is not met, then the output 114 pertaining to a recommendation to reject the claim associated with the request 102 may be produced at 518 recommending claim denial. In the case of provider appeals, the automatically generated letter 116 appealing the provider denial is not produced when the responsive data 196 fails to meet the approval threshold 452.

Figure 6:
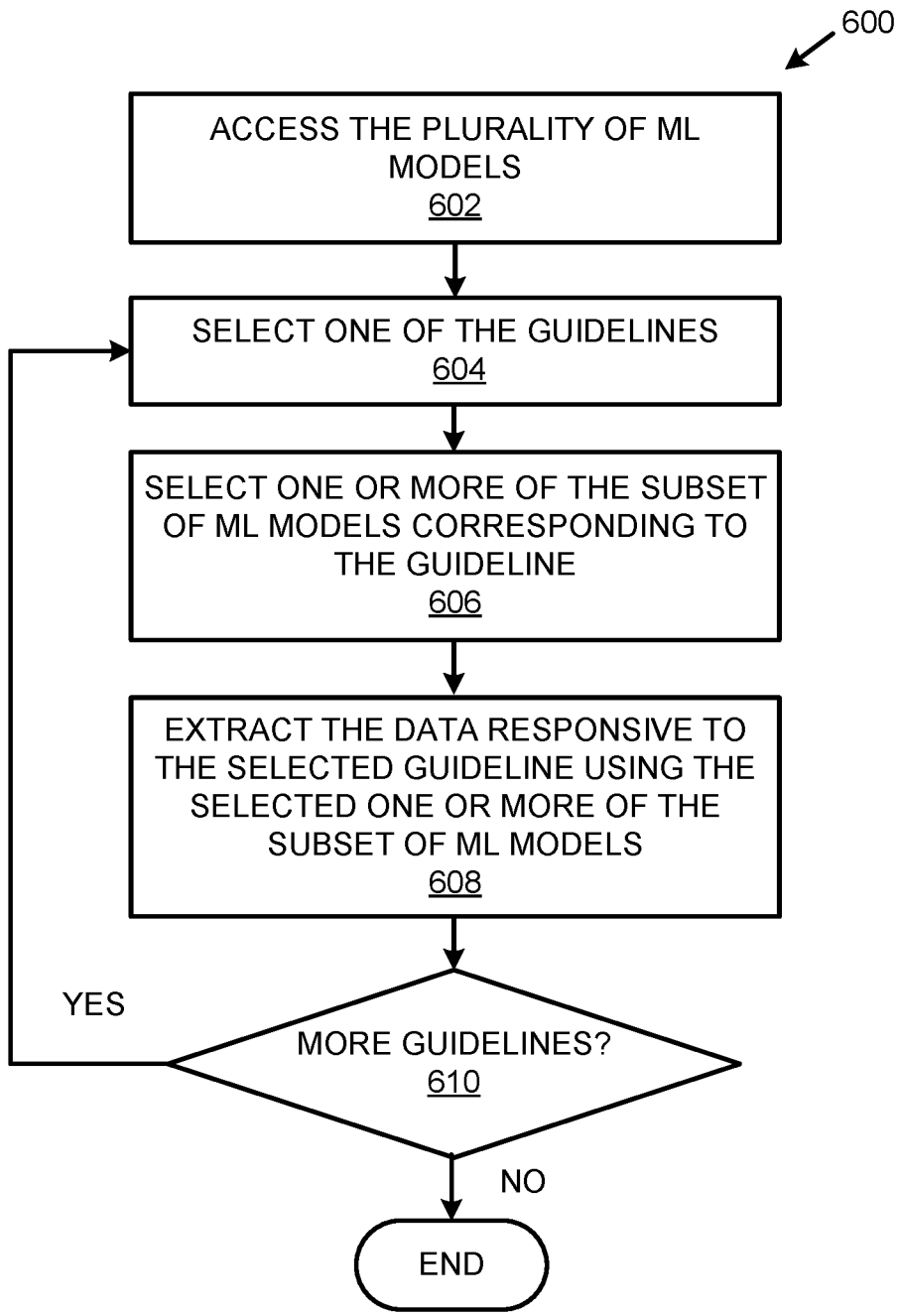
FIG. 6 shows a flowchart that details a method of extracting the responsive data using the plurality of ML models in accordance with the examples disclosed herein.

FIG. 6 shows a flowchart 600 that details a method of extracting the responsive data 196 using the subset of ML models 352 in accordance with the examples disclosed herein. Although the method describes application of ML models serially for data extraction, it can be appreciated that this is for illustration purposes only and that the subset of ML models 352 can be used simultaneously, e.g., in parallel, for the data extraction. At 602, the plurality of ML models 138 corresponding to each of the guidelines 194 that are trained to identify data responsive to the requirements of the guidelines 194 are accessed. At 604, one of the guidelines 194 is selected for processing. The corresponding ML model(s) that are trained to extract the data responsive to the selected guideline are further selected at 606. If, for example, the selected guideline includes requirements for more than one data item, then more than one ML model can be selected to extract data at 606. In an example, the model selector 302 may store a data structure such as a table that specifies the ML model(s) to be selected for a given guideline and the selection may be carried out in accordance with the information in the table. Each time one or more of a requirement and the ML models associated with the requirement are updated, the table can be correspondingly updated. The selected ML model(s) are applied to one or more of the request 102 and the external data sources 150 at 608 and the data responsive to the requirements is obtained. At 610, it is determined if more guidelines remain to be processed. If yes, the method moves to 604 to select the next guideline for processor. If it is determined at 610 that no more guidelines remain for processing the method terminates on the end block.

Figure 7:
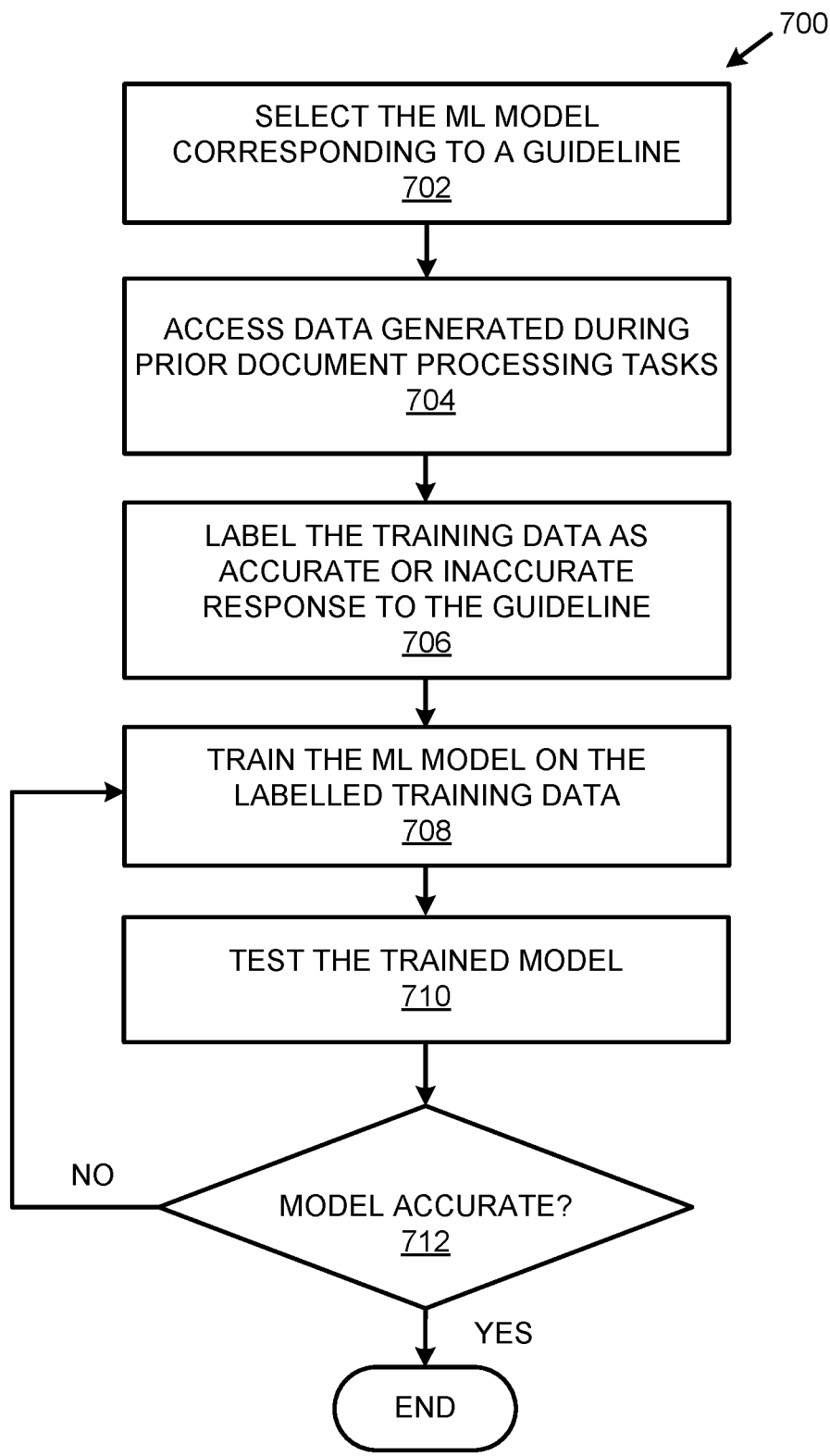
FIG. 7 shows a flowchart that details a method of training the plurality of ML models for extracting the data in accordance with the examples disclosed herein.

FIG. 7 shows a flowchart 700 that details a method of training the plurality of ML models 138 for extracting the data in accordance with the examples disclosed herein. At 702, one of the plurality of ML models 138 corresponding to one of the guidelines 194 is accessed. Each of the guidelines 194 can have corresponding one or more of the plurality of ML models 138 trained to provide data responsive to the guidelines based on a type of data that is expected. If the guideline expects text data in specific patterns such as social security numbers, dates, policy numbers, etc. then classification ML models suitable for prediction of textual data can be selected and trained to identify textual data in the specific pattern. If the guideline requires image data to be identified, then image classification ML models such as CNNs, deep learning networks (DLNs), etc. can be employed. In certain other examples, ensemble models based on two or more ML algorithms may also be employed. Accordingly, large volumes of training data for each of the plurality of ML models 138 that correspond to the type of data to be predicted by the ML model needs to be generated. At 704, data that was gathered and/or generated during prior document processing tasks which are similar to the document processing task 112 can be accessed. For example, documents pertaining to previously approved, settled, or rejected insurance claims can be digitized (i.e., scanned and text made machine-readable and machine searchable) and used to generate the training data 146. The training data 146 thus generated can be split into training data and test data. The collected data is used to train the plurality of ML models 138 and the test data can be used to test the trained ML model. Generally, the collected data is partitioned so that 80% of the data is training data while 20% of the data is used for testing the trained model.

The training data is labeled as accurate or inaccurate response to the guideline at 706 and provided to train the ML model at 708 for supervised learning. The trained ML model is tested with the testing data for accuracy at 710. It is determined at 712 if an adequate level of accuracy is achieved. The trained model is employed by the document processing system 100 as one of the plurality of ML models 138 for data extraction at 714 if adequate accuracy is obtained, else the ML model is further trained at 716 and its accuracy is again determined. The cycle may be repeated until satisfactory accuracy is achieved for the ML model.

The document processing system 100 can be used for executing various automatic document processing tasks in different organizations such as insurance companies, hospitals, pharmacies, etc. One of the automatic tasks that can be executed by the document processing system 100 in hospitals, doctors' offices, etc. includes inventory management.

Figure 8:
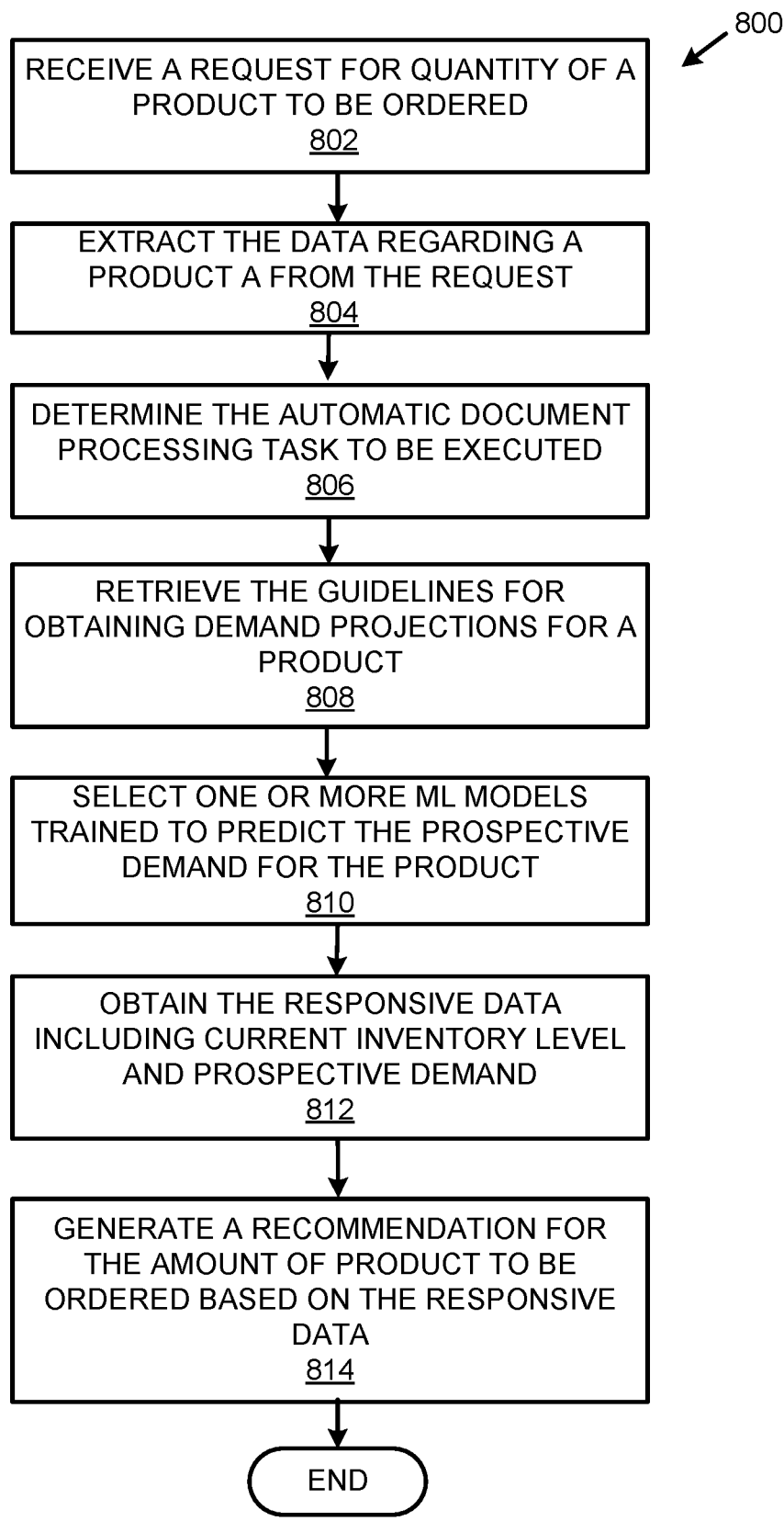
FIG. 8 shows a flowchart that details a method of managing an inventory in accordance with the examples disclosed herein.

FIG. 8 shows a flowchart 800 that details a method of managing an inventory by executing inventory management tasks in accordance with the examples disclosed herein. The document processing system 100 receives request 102, which can pertain to a query regarding the size of an order for a product in an inventory, e.g., syringes or other medical equipment. At 804, the data 108 regarding the inventory query and the product associated with the query is extracted by the request preprocessor 122 from the request 102. The tokens, POS tags and other output from the request preprocessor 122 is accessed by the process analyzer 124 to determine at 806 that the automatic document processing task 112 pertains to obtaining a demand projection for the product specified in the request 102 using, for example, a product id or a product code. The process analyzer 124 can use techniques such as but not limited to natural language processing (NLP) for analyzing the output of the request preprocessor 122 and identifying the process to be executed. The guidelines 194 for executing a process to obtain demand projections for a product are retrieved at 808 using the product id. The guidelines 194 can include requirements for current inventory levels of the product identified by the product id as well as requirements for predictions for prospective demand for the product for a predetermined time period based on current requirements. Accordingly, different programming constructs such as database access scripts, ML models, etc. can be used to obtained the responsive data 196 for the guidelines 194. The current inventory levels or stock levels can be obtained via running a query against the inventory database while a subset of one or more ML models 352 that are trained to predict the prospective demand for the product are selected at 810 from the plurality of ML models 138. The responsive data 196 including the current inventory levels of the product and the prospective demand for the product is obtained at 812. ML models based on approaches such as but not limited to, time series, linear regression, feature engineering, and random forests can be trained to project the prospective demand for the product using the current requirements. The recommendation 140 produced at 814 can include the quantity of the product to be ordered to meet the prospective demand in view of the current inventory levels.

Figure 9:
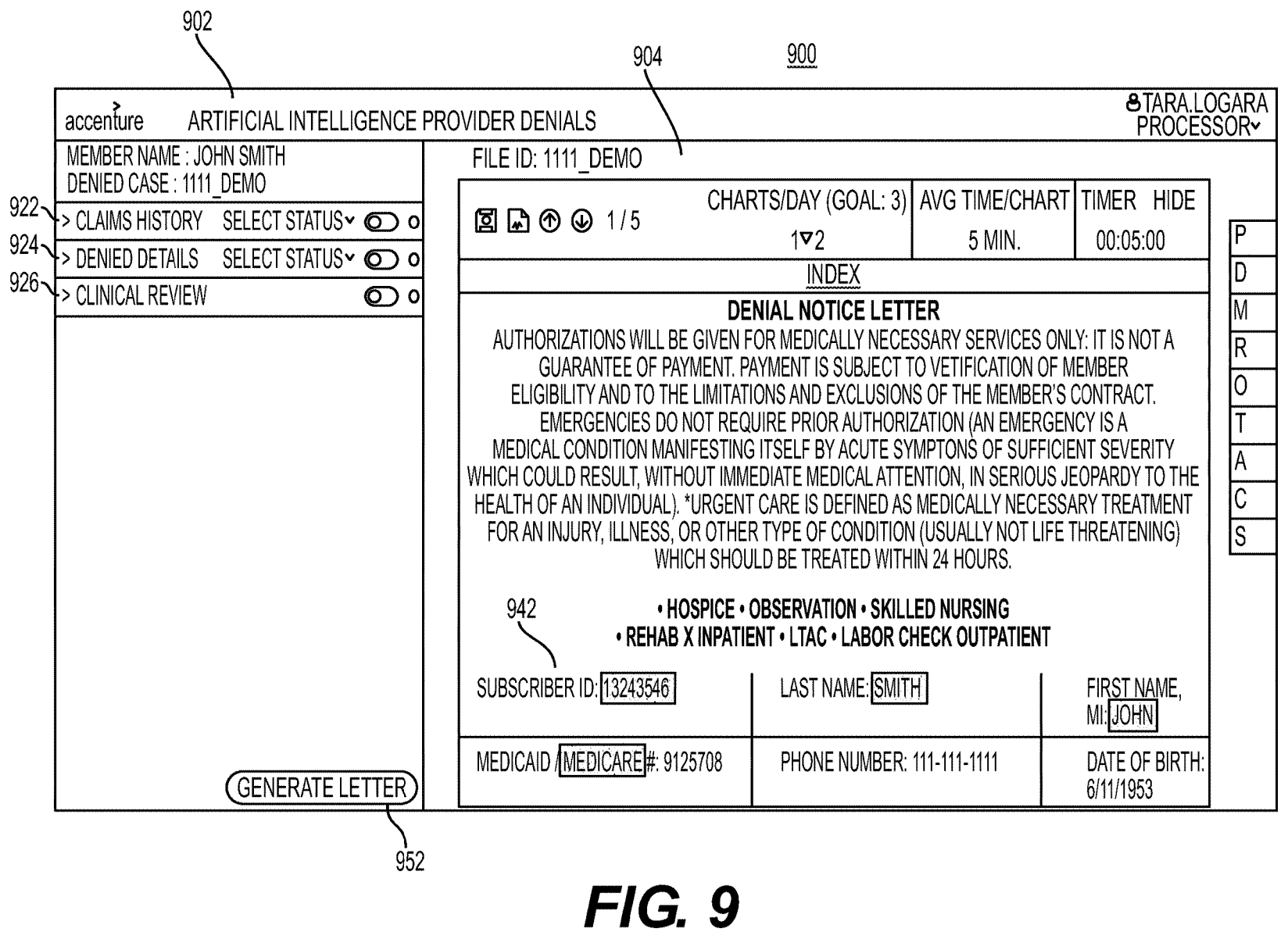

FIG. 9 shows an example GUI 900 which can be a GUI 160 generated by the document processing system 100 for an automatic document processing task associated with a provider denial in accordance with the examples disclosed herein. The GUI 900 includes certain features that may be commonly implemented across GUIs 160 generated for the various document processing tasks. These features can include a left-hand side (LHS) panel 902 which provides access to different sections of information extracted from the various documents that were received and processed in connection with the provider denial document processing task. For example, sections can include a claims history 922, a denied details 924, and a clinical review 926. As the GUI 900 pertains to the provider denials process, if the recommendation 140 suggests that the provider denial is improper or if a human validator deems the provider denial to be improper, a generate letter button 952 on the LHS panel 902 can be activated to automatically generate a letter appealing the denial. The GUI 900 also includes a right-hand side (RHS) panel 904 that displays the relevant information based on the selections made in the LHS panel 902. In an example, the relevant information can be shown in the RHS panel 904 from the original documents or original data source from which the relevant information was extracted. Also, the RHS panel 904 can highlight different attributes 942 of an entity associated with the document processing task. The GUI 900 displays the attributes 942 such as but not limited to, subscriber ID, last name, first name, Medicare no., phone number, date of birth, etc., of a subscriber associated with the provider denials process. A searchable representation of the documents 106 accompanying the request is therefore generated and displayed on the GUI 900.

FIG. 10 shows an example provider denial appeals letter 1000 that is automatically generated in accordance with the examples disclosed herein. The appeals letter 1000 includes a patient details section 1002 that is automatically filled with the attributes 942 gathered from the patient's file or documents. In addition to general attributes such as patient name, date of birth, member id, etc., specific details regarding a particular service pertaining to the denied matter such as the Hospital, dates of service, billed amount, etc., are also included in the patient details section 1002. In an example, a template of the letter may be stored in one of the data store 170, or the external data sources 150 can be retrieved. The template includes predetermined or standard language appealing the provider denial with place holders within the standard language for receiving at least a subset of the responsive data extracted from one or more of the request 102 and the external data sources 150. For example, the patient details section 1002 may include such place holders which are completed with the corresponding patient details retrieved from the request 102 and/or the external data sources 150. In an example, the tokens corresponding to the place holders can be identified using named entity recognition (NER), tokens from the responsive data 196, and the letter 1000 is generated with the tokens inserted or included in the corresponding place holders.

The body of the letter 1004 includes the details of the service that was denied to the patient and the pertinent information identified by the document processing system 100 where John who is 66 years old was categorized as being 50 years old as one of the reasons for withdrawal of the denial. Again, the template may include place holders that can be configured with scripts to receive the relevant patient details. When the human reviewer presses the submit button 1006, the denial appeals letter 1000 will be submitted to the health plan provider.

It can be appreciated that although the automatically generated letter 116 is described herein as a document with data inserted therein, other examples of automatically generated letters can include any document, file, etc., containing the relevant information in digital or hardcopy form.

In addition to the automated document processing tasks described above, the document processing system 100 can be employed in different fields for the automatic execution of various document processing tasks as outlined below.

Embodiments of the invention can be configured to address health payer use cases, such as provider claims and disputes. For example, document processing system 100 can be configured to review provider disputes and claims. For example, provider responses from claim denials can be reviewed for adjudication. Appeal letters for provider denials or other letters can be automatically generated as described above. Another health payer application of the document processing system 100 can include provider data management. For example, the document processing system 100 can be configured to review documents that are required to maintain, terminate, or add new provider data, such as data a doctor, nurse, lab technician, etc. The message 104 in the request 102 can include particular keywords such as but not limited to, "maintain", "terminate" or "add" new provider data which may be specified in one or more of the message 104 or the documents 106. Upon retrieving the guidelines 194 for the particular process and extracting the responsive data 196, the corresponding information in the external data sources 150 can be updated.

In some examples, the document processing system 100 can be used to address health provider use cases such as Starts and Healthcare Effectiveness Data and Information Set (HEDIS) Chart Review. Employers and individuals use HEDIS to measure the quality of health plans. HEDIS measures how well health plans give service and care to their members. In addition to evaluating healthcare plans, the document processing system 100 can also be configured to review medical records and Health Level Seven (HL7) messages for quality measures. HL7 International specifies a number of flexible standards, guidelines, and methodologies by which various healthcare systems can communicate with each other. Such guidelines or data standards are a set of rules that allow information to be shared and processed in a uniform and consistent manner. These data standards are meant to allow healthcare organizations to easily share clinical information. Again, the request 102 can include medical records and/or HL7 messages while the quality measures (i.e., the guidelines 194) can be retrieved from the external data sources 150. The document processing system 100 can extract the responsive data 196 for the requirements specified in the quality measures and generate the recommendation 140 on whether the medical records or the HL7 messages meet the requirements of the quality measures.

The document processing system 100 also finds application in the risk adjustment chart review. For example, the document processing system 100 can be configured to review medical records and/or HL7 messages. The guidelines 194 can include requirements to determine if the risk adjustment reimbursement was received. Based on the responsive data 196 retrieved by the data extractor 128, the output 114 can include a recommendation on whether or not the risk adjustment reimbursement was received.

Another application of the document processing system 100 in the health provider use cases includes utilization management document intake. The document processing system 100 can be configured to perform indexing of authorization forms for prior, post, and concurrent review.

The document processing system 100 can also be employed to restructure unstructured data into Electronic Medical Records (EMR). EMRs typically contain general information such as treatment and medical history about a patient. By implementing EMR, patient data can be tracked over an extended period of time by multiple healthcare providers. Unstructured data and documents can be restructured into EMR profile using the document processing system 100.

The document processing system 100 can be configured for clinical coding/billing to review International Classification of Diseases (ICD) 10 codes (or ICD 9 codes whichever is applicable) and flag for charging. The ICD-10 codes are broken down into chapters and subchapters and include a letter plus two digits to the left of the decimal point, then one digit to the right. The new system allows for a more specific diagnosis. When a medical service provider submits a bill to insurance for reimbursement, each service is described by a common procedural technology (CPT) code, which is matched to an ICD code. The document processing system 100 can receive the provider's bill in the request 102. The data 108 is extracted from the request 102. The guidelines 194 include requirements where the CPT code from the bill in the request 102 be aligned with the corresponding ICD code. If the two codes don't align correctly with each other, a recommendation can be generated to reject the payment. In other words, if the service isn't one that would be typically provided for someone with that diagnosis, insurance will not pay. Therefore, the document processing system 100 can analyze the codes and correlate the tests to diagnoses to ensure correct reimbursement. In case there are any discrepancies, the reimbursements may be denied and the provider denial process may be activated at that point.

The document processing system 100 can be configured to process social determinants of health to isolate determinants to improve health outcomes.

The document processing system 100 can be configured for use in precision medicine to isolate determinants for better health outcomes and to provide a tailored treatment to individuals based upon available clinical data down to the genomic level.

Non-clinical applications for the document processing system 100 can include supply chain management for forecasting usage of medical supplies as detailed above, insurance credentialing, auto claims processing, mortgage/loan application processing, insurance data management, etc. For example, the document processing system 100 can be configured to perform a clinical review of authorization forms for prior, post, and concurrent review.

The document processing system 100 can be employed in the automotive sector for reviewing the information provided to support auto insurance claims. The request 102 can include information and documents related to an auto insurance claim. Based on the information conveyed in the request 102, the process identifier 132 and hence the guidelines 194 are retrieved as disclosed herein. The data extractor 128 can extract the responsive data 196 using the plurality of models 138 which can be trained on prior auto insurance claim data as described above. Depending on whether the responsive data 196 meets the approval threshold 452, the recommendation 140 may suggest approving or rejecting the auto insurance claim.

The document processing system 100 can be configured to review documents to support loan or mortgage applications in yet another non-clinical application. Based on the information conveyed in the request 102 which can include the documents 106 that support the loan/mortgage application, the guidelines 194 are retrieved as disclosed herein using one or more of NER and NLP. The data extractor 128 can extract the responsive data 196 using the plurality of models 138 which can be trained on prior loan/mortgage data as described above. Depending on whether the responsive data 196 meets the approval threshold 452, the recommendation 140 may suggest approving or rejecting the loan/mortgage application.

The document processing system 100 can be configured for management of structured and unstructured information relating to insurance policies, applications, and claims in a use case.

Another use case for the document processing system 100 can include identification of potential fraud in insurance claims.

The document processing system 100 can be configured for extracting data from unstructured documents and transforming it into evidence for decision making in yet another use case. If the request 102 includes one or more of the message 104 and the documents 106 in the form of unstructured data, the request preprocessor 122 and the data extractor 128 can be configured to extract the responsive data 196 which enables generating the recommendation 140 regarding the request 102 based on the responsive data 196 meeting the requirements in the guidelines 194 which provide the requirements for the presence or absence of real-world evidence.

The document processing system 100 also finds applications in the fields of clinical research and patient matching. The document processing system 100 can be configured for mining scientific literature and matching appropriate patients for clinical trials. If the request 102 includes one or more of the message 104 and the documents 106 pertaining to patients. An identifier for the clinical trials can be extracted to retrieve the guidelines 194 for selecting patients for the clinical trials. The responsive data 196 regarding each of the patients can be extracted from one or more of the external data sources 150 or the information provided with the request 102 using the plurality of ML models 138 for the requirements outlined in the guidelines 194. The plurality of ML models 138 can be trained on prior patient records to identify conditions within the patient records that would make a patient a good candidate for the specific clinical trial. Those patients whose data matches the requirements as determined by the approval threshold 452 can be recommended for the clinical trial by the output generator 142.

Regulatory Compliance forms yet another use case for the document processing system 100. Particularly, the document processing system 100 can be configured to find, highlight, and extract key data within regulatory documents which may be received in the request 102. The guidelines 194 can specify the requirements for regulatory compliance. The data extractor 128 can employ the plurality of ML models 138 which are trained to extract the responsive data 196 in accordance with the requirements. The key data (i.e., the responsive data 196) can, therefore, be extracted from the regulatory documents.

Other use cases for the document processing system 100 include precision medicine, drug discovery, and pharmaceutical covigilence.

In the field of precision medicine, the document processing system 100 can be configured for providing tailored treatment to individuals based upon available clinical data down to the genomic level.

The document processing system 100 can be configured for use in drug discovery by employing NLP to extract previously discovered chemical reactions to evaluate the need for experiments.

As an application for use in pharmaceutical covigilence, the document processing system 100 can be configured for identifying potential safety opportunities earlier in the drug development process and achieving faster Adverse Drug Reactions (ADR) and Medical Device Reporting (MDR) determinations and improved safety profiles.

Other clinical use cases for the document processing system 100 include processing compensation and pensions, medical research, medical records processing, etc.

The document processing system 100 can be configured to review clinical information provided with the request 102 including one or more of the message 104 and the documents 106 to determine compensation and pension benefits. The guidelines 194 including requirements to be met for compensation and benefits are retrieved. The responsive data 196 is extracted from the information provided by the message and one or more of the external data sources 150. Based on the threshold(s) met by the responsive data 196, the compensation and benefits for a candidate can be provided in the recommendation 140.

The document processing system 100 can be employed for Medical Record Processing at the Centers for Medicare and Medicaid Services, Military Health System, etc., and for Risk Adjustment Data Validation in a use case. The document processing system 100 can be configured to review medical records for processing for example, at Centers for Medicare and Medicaid Services (CMS), Military Health System, etc. Furthermore, the document processing system 100 can also be employed for Risk Adjustment Data Validation (RADV). The request 102 for review of the medical records is received by the document processing system 100 and the medical records can be either received with the request 102 or may be accessed from the external data sources 150 based on the information in the request 102. The guidelines 194 for reviewing the medical records are retrieved and the responsive data 196 is extracted using the plurality of ML models 138 as described herein. The medical records may be reviewed to determine if they meet the requirements in the guidelines 194 based on the approval thresholds as discussed herein.

Non-clinical uses for the document processing system 100 can include, functions such as procurement, customer engagement, etc.

The document processing system 100 can be configured to review documents and contractual terms to recommend buying decisions. The request 102 can include information such as product lists, prices, etc. The guidelines 194 can include contractual terms and the data extractor 128 extracts the responsive data 196 from the request 102, If the responsive data 196 matches the requirements set forth by the contractual terms (i.e., the guidelines 194) as indicated by the approval threshold 452, then a recommendation to buy the products can be generated by the output generator 142. If the responsive data 196 fails to match the requirements set forth by the guidelines 194, then a recommendation against buying the products can be generated by the output generator 142.

The document processing system 100 can be configured with voice-to-text APIs so that the request 102 may not only be received in textual/document format but may also be received as a voice message. NLP processing can be implemented on the text extracted from the voice messages for processing of customer benefit requests and questions.

Figure 11:
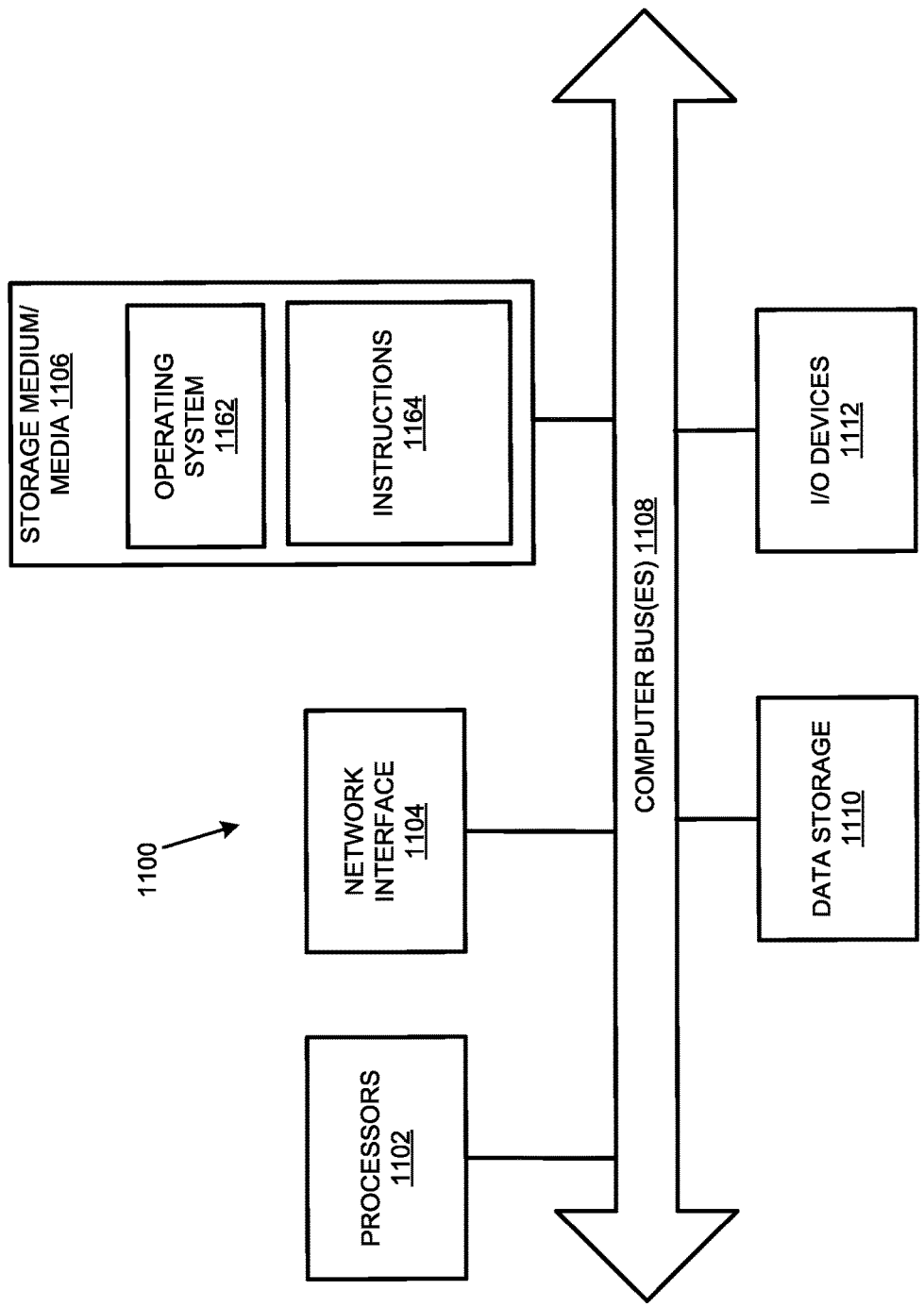
FIG. 11 illustrates a computer system that may be used to implement the document processing system in accordance with examples described herein.

FIG. 11 illustrates a computer system 1100 that may be used to implement the document processing system 100. More particularly, computing machines such as desktops, laptops, smartphones, tablets, wearables which may be used to generate or access the non-editable files corresponding to unstructured documents and their component documents may have the structure of the computer system 1100. The computer system 1100 may include additional components not shown and that some of the components described may be removed and/or modified. In another example, the computer system 1100 can be implemented on external-cloud platforms such as, but not limited to, Amazon Web Services, AZURE® cloud or internal corporate cloud computing clusters, or organizational computing resources, etc.

The computer system 1100 includes processor(s) 1102, such as a central processing unit, ASIC or other type of processing circuit, input/output devices 1112, such as a display, mouse keyboard, etc., a network interface 1104, such as a Local Area Network (LAN), a wireless 802.11x LAN, a 3G, 4G or 5G, a mobile WAN or a WiMax WAN, and a computer readable storage medium 1106. Each of these components may be operatively coupled to a bus 1108. The computer readable storage medium 1106 may be any suitable medium which participates in providing instructions to the processor(s) 1102 for execution. For example, the computer readable storage medium 1106 may be non-transitory or non-volatile medium, such as a magnetic disk or solid-state non-volatile memory or volatile medium such as RAM. The instructions or modules stored on the computer readable medium 1106 may include machine readable instructions 1164 executed by the processor(s) 1102 to perform the methods and functions of the document processing system 100.

The document processing system 100 may be implemented as software stored on a non-transitory computer readable medium with processor-executable instructions executed by one or more processors. For example, the computer readable medium 1106 may store an operating system 1162, such as MAC OS, MS WINDOWS, UNIX, or LINUX, and code or machine readable instructions 1164 for the document processing system 100. The operating system 1162 may be a multi-user, multiprocessing, multitasking, multithreading, real-time and the like. For example, during runtime, the operating system 1162 is running and the code for the document processing system 100 is executed by the processor(s) 1102.

The computer system 1100 may include a data storage 1110, which may include non-volatile data storage. The data storage 1110 stores any data used by the document processing system 100. The data storage 1110 may be used to store real-time data associated with the processes executed by the document processing system 100 such as the received requests, the various automatic document processing tasks to be executed, the data 108 initially extracted from the requests, the ML models 138, the responsive data 196, the recommendations and the letters that are automatically generated and the like.

The network interface 1104 connects the computer system 1100 to internal systems for example, via a LAN. Also, the network interface 1104 may connect the computer system 1100 to the Internet. For example, the computer system 1100 may connect to web browsers and other external applications and systems via the network interface 1104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A document processing system, the system comprising:
at least one data storage device storing at least a plurality of Machine Learning (ML) models, and
one or more processors executing machine readable instructions stored in the at least one storage device to:
receive a request comprising information related to an automated document processing task to be executed,
where the automated document processing task produces an output responsive to the request based at least on the information provided in the request;
extract a process identifier that identifies the automated document processing task to be executed from a plurality of automated document processing tasks,
where the process identifier is extracted by preprocessing the request;
identify the automated document processing task associated with the request using the process identifier;
retrieve guidelines associated with the automated document processing task using the process identifier,
where the guidelines include requirements for completing the automated document processing task;
select a subset of machine learning (ML) models from the plurality of ML models stored on the at least one data storage device,
where each ML model of the subset of ML models is trained to extract data for the requirements of a corresponding guideline from one or more of the information and at least one external data source;
extract data responsive to the requirements in the guidelines using the selected subset of ML models from a plurality of ML models;
determine if a threshold condition for fulfilling the request is met based at least on the responsive data extracted by the subset of ML models,
where the threshold condition includes at least a minimum number of the requirements to be met by the responsive data; and
generate the output responsive to the request based on the responsive data extracted by the subset of ML models meeting the threshold condition,
where the output includes one or more of:
a recommendation to approve the request and a first automatically generated letter, or
a recommendation to reject the request and a second automatically generated letter.

2. The document processing system of claim 1, where to extract the data responsive to the requirements, the processor is to further:
extract one or more documents included in the request,
where the one or more documents pertain to the automatic document processing task;
generate a searchable representation of the one or more documents included in the request; and
display the searchable representation of the one or more documents included in the request on a graphical user interface (GUI).

3. The document processing system of claim 2, where the processor is to further:
parse and tokenize the one or more documents; and
identify parts of speech (POS) tags to tokens produced from the one or more documents.

4. The document processing system of claim 1, where the request includes a claim pertaining to an insurance policy and to extract the data responsive to the requirements of the insurance policy the processor is to further:
employ named entity recognition (NER) for identifying details of a claimant associated with the claim,
where the details include name, address, organization, and policy identifier.

5. The document processing system of claim 1, where the processor is to further:
train the plurality of ML models on labeled training data for each of the plurality of ML models,
where the labeled training data identifies data that is responsive to each of the requirements in different documents from historical records.

6. The document processing system of claim 1, where to extract the data responsive to the guidelines using the subset of ML models the processor is to:
select at least a logistic regression model from the plurality of ML models,
where the logistic regression model is trained for extracting data pertaining to a categorical variable, and
where the categorical variable constitutes the responsive data for one of the guidelines.

7. The document processing system of claim 1, where to extract the data responsive to the guidelines using the subset of ML models the processor is to:
select at least a convolutional neural network (CNN) model from the plurality of ML models,
where the CNN model is trained for extracting data from images included in the request, and
where the images constitute the responsive data for one of the guidelines.

8. The document processing system of claim 1, where to extract the data responsive to the guidelines using the subset of ML models the processor is to:
select ensemble models from the plurality of ML models for extracting data from one or more of the information included in the request and at least one external data source.

9. The document processing system of claim 1 where the automated document processing task pertains to an insurance claim included in the request and to generate the output responsive to the request, the processor is to:
include within the output, one or more documents received with the request that support a recommendation made in the output to approve or reject the insurance claim.

10. The document processing system of claim 1, where the automated document processing task pertains to a provider denial of an insurance claim and to generate the output responsive to the request the processor is to:
- access a template for a letter responding to the provider denial of the insurance claim,
  - where the template includes predetermined language appealing the provider denial with place holders within the predetermined language for receiving at least a subset of the responsive data extracted from one or more of the information and the at least one external data source;
- identify using named entity recognition (NER), tokens from the responsive data, the tokens corresponding to the place holders; and
- generate the letter with the tokens included in the corresponding place holders.

11. The document processing system of claim 1, where the automated document processing task pertains to an inventory management task and to generate the output responsive to the request the processor is to:
- identify at least one product from the information included in the request for which a number of products to be ordered is to be determined;
- determine a number of the products currently in stock in an inventory from the at least one external data source based on the guidelines;
- select a subset of one or more ML models from the plurality of ML models that are trained to provide demand projections for the product based on current requirements;
- obtain a prospective demand for the product using the demand projections from the selected subset of ML models; and
- generate the number of products to be ordered based on a comparison of the prospective demand and the number of products currently in stock.

12. The document processing system of claim 11, where the subset of ML models are based on one or more of time series, linear regression, and random forests methodologies.

13. A machine-implemented method of executing an automatic document processing task, comprising:
- receiving a request comprising information related to an automated document processing task,
  - where the automated document processing task relates to processing an appeal,
    - the appeal associated with a provider denial of an insurance claim, and
  - the automated document processing task producing an output, and
  - the output responsive to the request based at least on the information provided in the request;
- identifying that the automated document processing task pertains to the appeal of the provider denial of the insurance claim using a process identifier,
  - where the process identifier is extracted by preprocessing the request;
- retrieving guidelines associated with the appeal using the process identifier,
  - where the guidelines include requirements for completing the processing of the appeal;
- extracting data responsive to the requirements in the guidelines using a plurality of machine learning (ML) models,
  - where each ML model of the plurality of ML models is trained to extract the responsive data for the requirements of a corresponding guideline from one or more of the information and at least one external data source,
  - and each ML model is trained for the data extraction based at least on a type of data to be extracted from one or more of the information and at least one external data source in response to the requirements;
- determining that an approval threshold for processing the appeal is met based at least on the responsive data extracted by the plurality of ML models,
  - the approval threshold includes at least a minimum approval score to be met by the responsive data; and
- generating an appeal letter to the provider,
  - where the appeal letter includes at least a subset of the responsive data inserted into a template.

14. The method of claim 13, where generating the appeal letter further comprises:
- providing the responsive data including the minimum approval score for validation on a graphical user interface (GUI),
  - where the GUI includes a button for the generation of the appeal letter.

15. The method of claim 14, further comprising:
- generating the appeal letter upon receiving an activation of the button.

16. The method of claim 13, where generating the appeal letter further comprises:
- accessing the template for the appeal letter; and
- identifying a data item from the responsive data that corresponds to each place holder in the appeal letter.

17. The method of claim 13, where generating the appeal letter further comprises:
- providing one or more documents with the appeal letter,
  - where the documents are retrieved from one or more of the request and at least one external data source.

18. The method of claim 13, where the plurality of ML models include one or more classification models, convolution neural networks (CNNs), and ensemble models.

19. A non-transitory storage medium comprising machine-readable instructions that cause at least one processor to:
- receive a request comprising information related to an automated document processing task to be executed,
  - where the automated document processing task produces an output responsive to the request based at least on the information provided in the request;
- extract a process identifier that identifies the automated document processing task to be executed from a plurality of automated document processing tasks,
  - where the process identifier is extracted by preprocessing the request;
- identify the automated document processing task associated with the request using the process identifier;
- retrieve guidelines associated with the automated document processing task using the process identifier,
  - where the guidelines include requirements for completing the automated document processing task;
- select a subset of machine learning (ML) models from a plurality of ML models,
  - where each ML model of the subset of ML models is trained to extract data for the requirements of a corresponding guideline from one or more of the information and at least one external data source;
- extract data responsive to the requirements in the guidelines using the selected subset of ML models from the plurality of ML models;
- determine if a threshold condition for fulfilling the request is met based at least on the responsive data extracted by the subset of ML models, where the threshold condition includes at least a minimum number of the requirements to be met by the responsive data; and generate the output responsive to the request based on the responsive data extracted by the subset of ML models meeting the threshold condition, where the output includes one or more of a recommendation to approve or reject a request and an automatically generated letter.

20. The non-transitory storage medium of claim 19, further comprising instructions that cause the processor to:

extract one or more documents from the request; and generate a searchable representation of the one or more documents included in the request on a graphical user interface (GUI).

* * * * *